April 5, 1960  N. S. BESTOSO  2,931,321
PROCESS FOR FORMING CANDY INTO TWISTED STICK LENGTH UNITS
Original Filed April 3, 1951  4 Sheets-Sheet 4
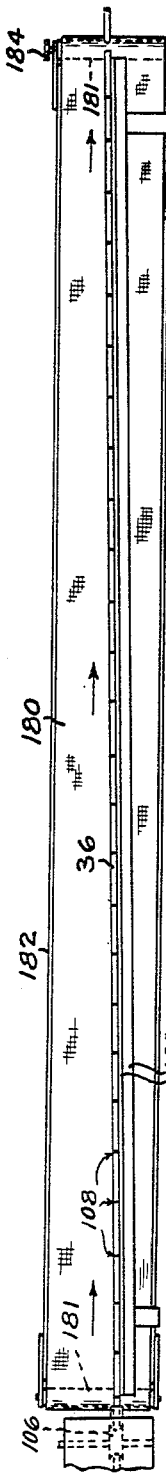
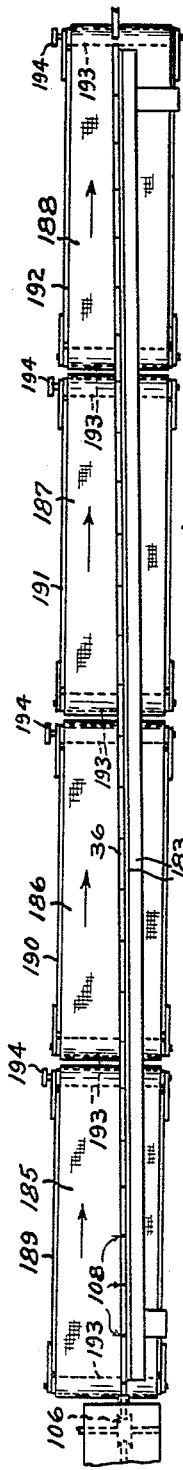
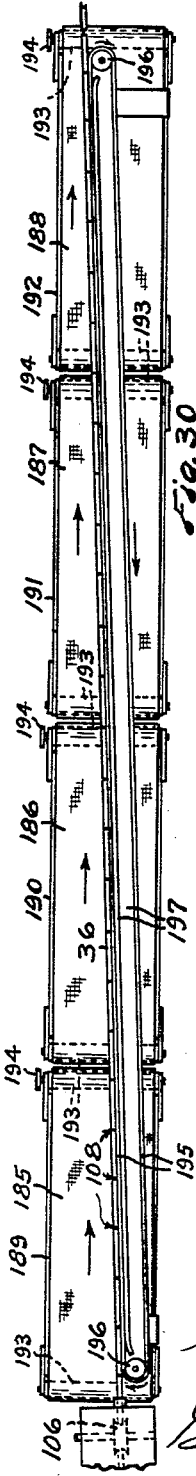
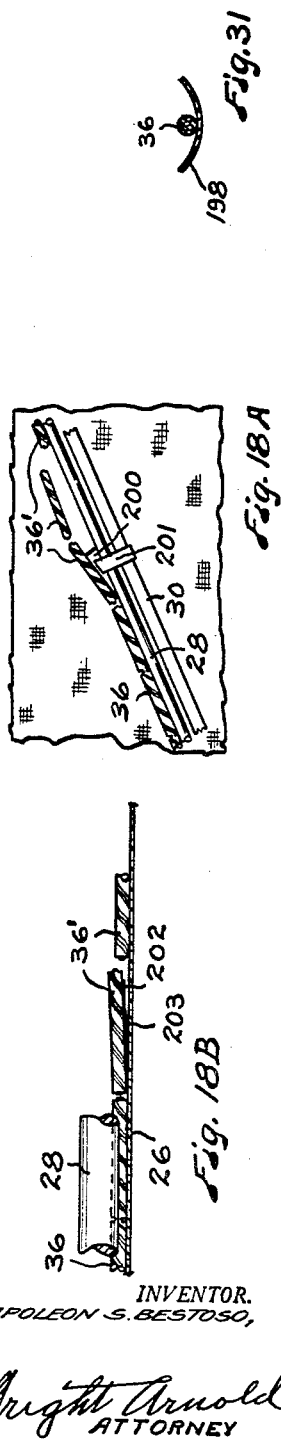
INVENTOR.
NAPOLEON S. BESTOSO,
BY
Wright Arnold
ATTORNEY

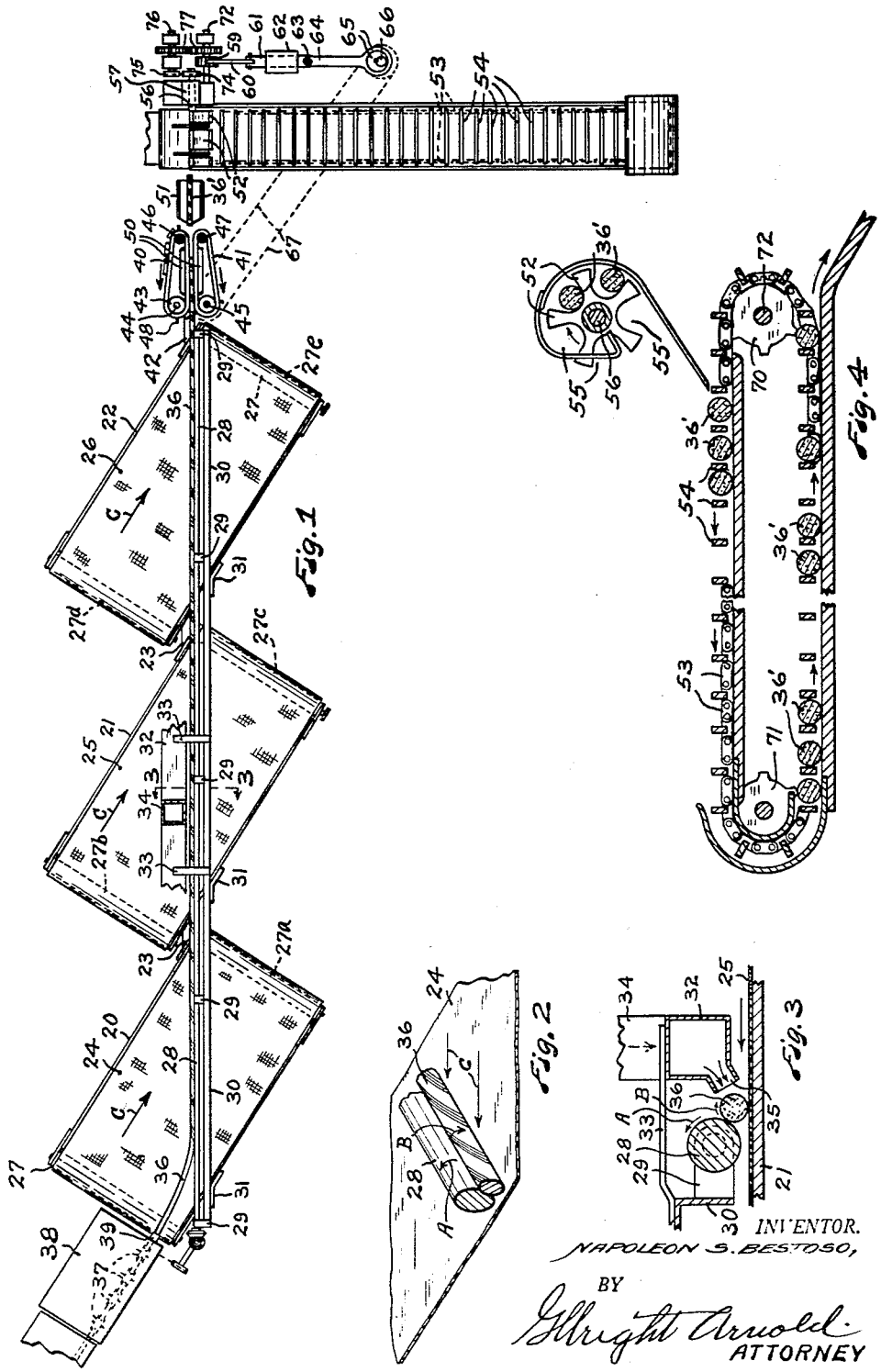

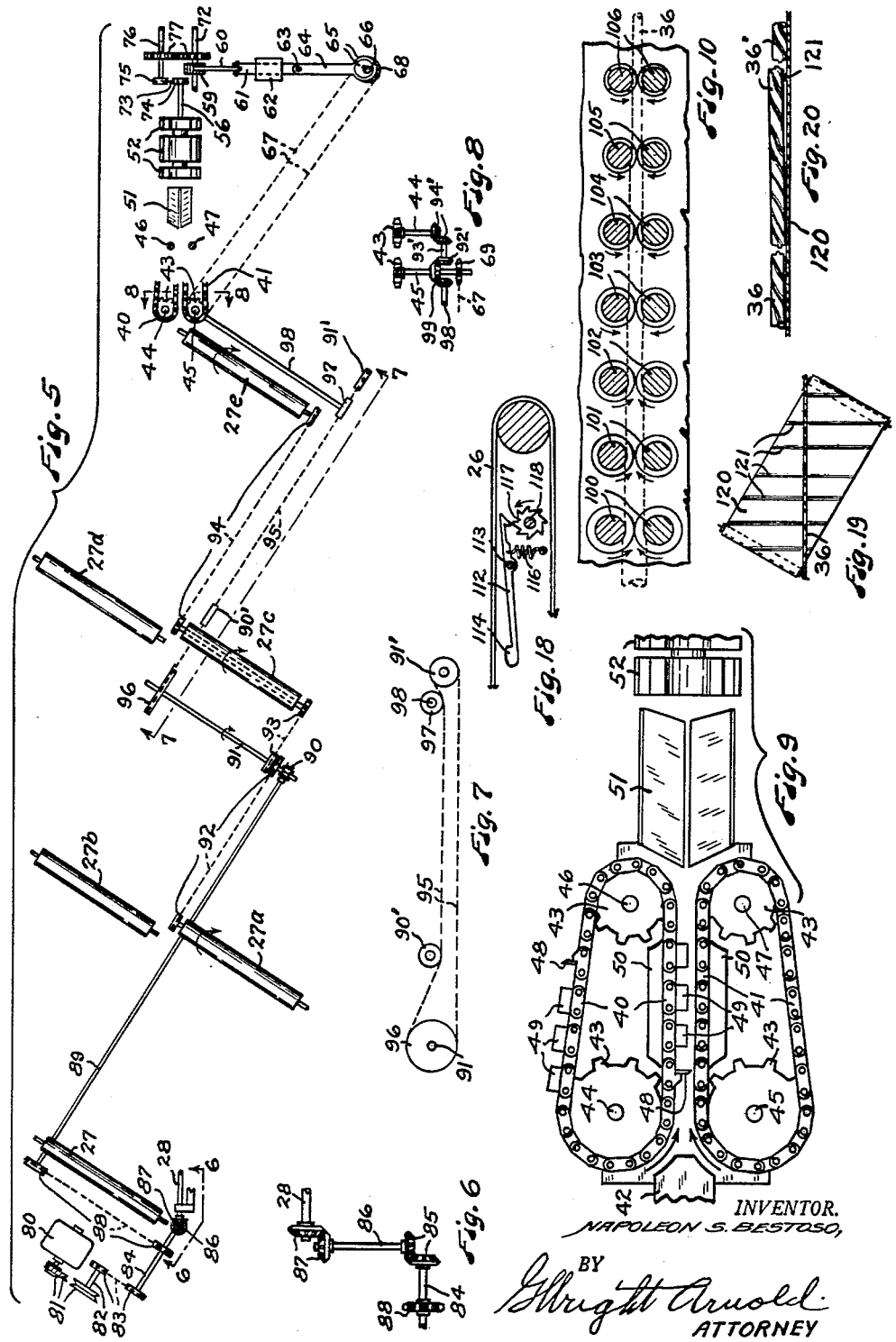

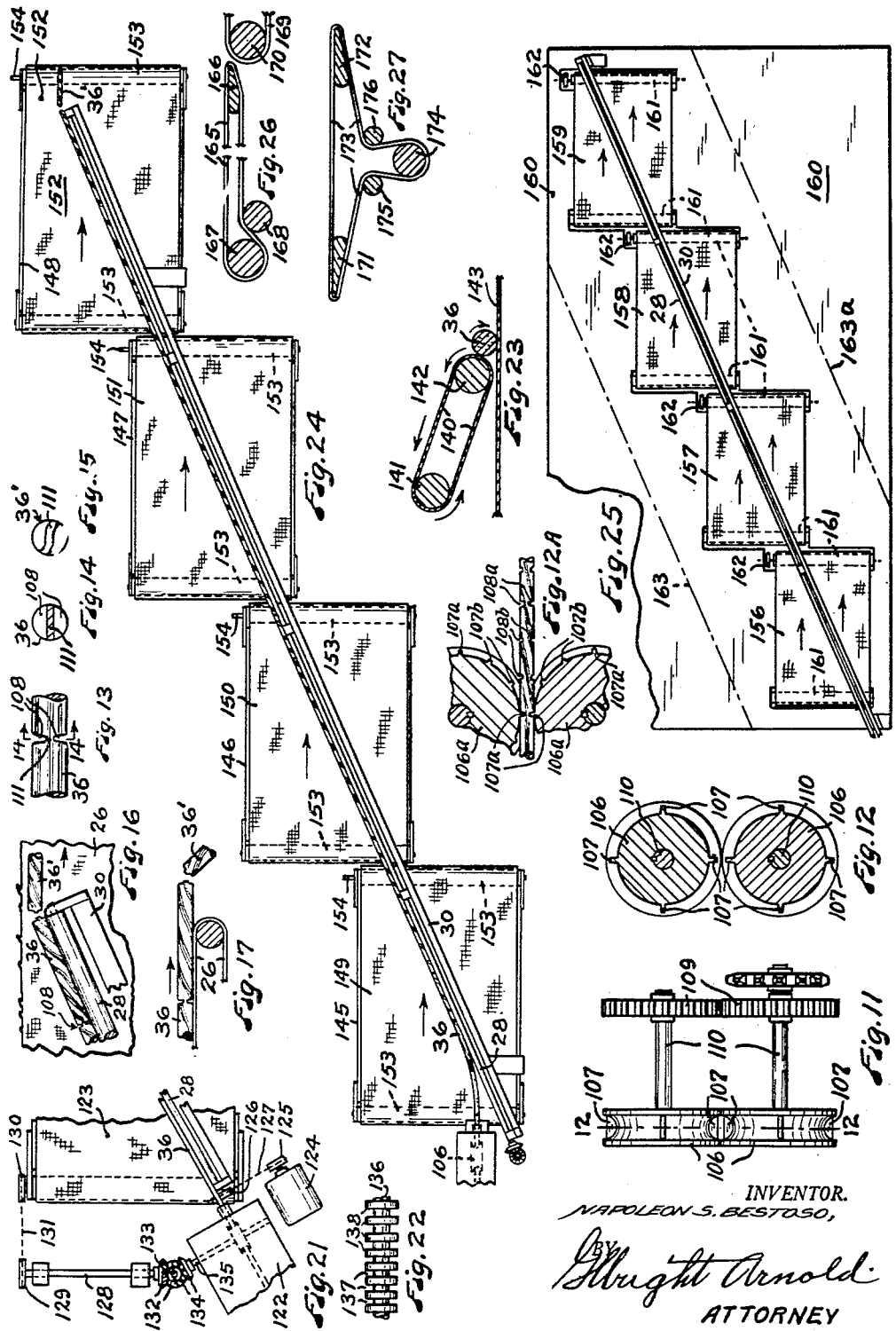

United States Patent Office 2,931,321
Patented Apr. 5, 1960

2,931,321
PROCESS FOR FORMING CANDY INTO TWISTED STICK LENGTH UNITS

Napoleon S. Bestoso, Puyallup, Wash.

Original application April 3, 1951, Serial No. 219,024, now Patent No. 2,767,665, dated October 23, 1956. Divided and this application February 1, 1956, Serial No. 562,914

19 Claims. (Cl. 107—54)

My invention relates to the process of forming candy into units, and units of stick length having a twist, and mechanism for carrying out said process.

The fundamental purpose and object of my invention is automatically to provide twisted candy of stick length. Such twisted candies may be with or without the colored longitudinally directed markings thereon. My invention relates especially to imparting a uniformity of twist that results in a product of superior appearance, appeal, and neatness of formation, and one without coming in contact with the hands of the operators throughout the forming thereof.

Also, my invention relates to subdividing candy and providing an end portion of uniform pattern. Moreover, my invention also relates to providing stick candy of predetermined length without the preferred form, that is, the twisted form.

Stick candy, for example peppermint with the red and white stripes running parallel and longitudinally thereof, is well known. The said type of stick candy has been manually twisted in order to have the colors spirally extending parallel and lengthwise of the stick. The manual twisting, according to common practice, is performed as follows:

The candy is pulled from the forming machine in a plastic heated condition and is caused to extend over a long table in the form of what is called in the candy art, a rope of candy. This rope strip or rod of candy is subsequently cooled and becomes of straight rod-like rigidity and, in general, will be referred to herein as the rope of candy. This rope may be of the order of fifteen or twenty or more feet in length varying with the thickness or diameter of the candy stick to be formed. The operator at one end of the table in providing the twist presses the palm of his hand on top of the candy rope, thereby pressing the candy against the top of the table, and rolls the candy rope toward himself, thereby turning the candy in a clockwise direction (i.e., when looking toward the end of the rope of candy remote from the candy former). At the same time, the operator at the remote end of the table presses the palm of his hand upon the top of the candy rope, pressing the same against the table, and rolls outwardly the rope of candy, thereby giving the rope a counter-clockwise roll—both operators facing the same direction. Accordingly, said clockwise and counter-clockwise rolling imparted to the candy rope or rod obviously results in a twist providing the spiral winding to the candy rope. Thereafter, the candy rope is subdivided into stick lengths by means of a special hand form of cutter or clipper which imparts a sharp blow which cracks the candy transversely of its diameter—the fracture following no definite pattern. In short, the fracture may angle one way or the other through the candy, giving an irregular end.

One of the primary objects of my invention is to provide this twisting operation to be done mechanically and automatically without contact with human hands, and thereby provide for a more sanitary and more economically manufactured product. In general, and briefly and therefore incompletely stated, this twisting is accomplished by providing for causing the candy rope to come in contact with a plurality of conveyor belts moving obliquely or in echelon relation with respect to a rotating shaft toward which the candy rope is thus conveyed at an angle and is therefore subjected to pulling and conveying forces, the pulling force being accentuated by having each succeeding belt operating at a greater speed than the one preceding.

It is an object of my invention to provide the stick of candy characterized by its uniformity of the degree of twisting.

Moreover, an object of my invention is to simultaneously with the twisting provide for subdividing of the candy to be done mechanically and automatically, which results in a candy stick characterized by uniformity of length and with a neatly finished end portion of uniform character or pattern in definite contrast to the irregular broken ends of stick candy as commonly prepared heretofore. My invention does not permit the haphazard breakthrough of the rope of candy in its subdivision into stick lengths.

Among requirements of a machine for forming candy into units are the following:

One of the paramount requirements of the candy machine is that it must be capable of being easily cleaned.

The candy twisting machine must provide for insuring the positive drive for imparting a twist to the rope of candy and, at the same time, it must not deform the rope of candy either transversely or longitudinally, so that a straight rod of candy results upon cooling. The rotating shaft of my invention is operative at a speed, as compared to the speed of the conveyor belts, which will keep the candy rope in front of the shaft and prevent it from being carried beneath the shaft by the conveyor belt, which, if this occurred, would deform the same. Also, the speed of rotation imparted to the candy rope by said shaft is employed in my invention to maintain the circular form of the candy rope while cooling from a plastic condition into the straight rigid rod of candy.

The separation of the long candy rope issuing from the candy former into sticks of uniform length is another function which must be provided by the machine if the forming of the candy into stick units is to be completed. It is the purpose of my invention, in general, to limit the number of parts of the machine and make it as simple as possible and, at the same time, form the completely twisted candy rope of stick length with uniform ends, and all this with substantially no, or at least very little, breakage.

One of the important features of my invention in imparting the twist to the candy is to provide the candy rope with a proper progressive cooling means so that the candy stick will congeal into a set form and will be straight. One of the inherent characterizing natures of heated candy is to contract when it is attempted to be drawn into stick form. It is important that the candy stick be straight, not only for appearance sake, but otherwise it will not operate satisfactorily in the wrapping machine or lie uniformly in the boxes when packed for shipment. My invention provides for imparting a pulling force or subjecting the rope of candy to a tension force. This contributes to maintaining the candy rope straight and of a predetermined length; that is, the inherent nature to contract upon cooling is offset.

A primary and fundamental object of my invention is to provide a process and mechanism for carrying out said process which will overcome previous difficulties and meet all of the above set forth several requirements and conditions.

The above-mentioned general objects of my invention, together with others inherent in the same, are attained by the mechanism illustrated in the following drawings throughout which drawings like reference numerals indicate like parts:

Figure 1 is a somewhat diagrammatic plan view of mechanism embodying my invention;

Fig. 2 is an enlarged fragmentary perspective view of the rotatable shaft with candy rope pressed against the same, and a portion of the canvas belt on which the candy rope is supported while being twisted;

Fig. 3 is an enlarged fragmentary cross-sectional view on line 3—3 of Fig. 1 showing a cold air duct opening upon said candy rope;

Fig. 4 is a fragmentary view partly in section and partly in elevation of the conveyor mechanism located after the candy rope divider mechanism;

Fig. 5 is a diagrammatic view of the power means for actuating the endless canvas belt, the shaft, the cutter, the conveyor mechanism, and the rope subdivider or cutter mechanism;

Figs. 6, 7, and 8 are somewhat diagrammatic fragmentary detached views looking in the directions indicated by broken lines 6—6, 7—7, and 8—8 of Fig. 5, and illustrating parts of the driving mechanism;

Fig. 9 is a detached plan view of the subdivider or cutter mechanism, transfer table, and the conveyor roller;

Fig. 10 is a fragmentary view partly in section and partly in elevation showing a set of candy forming rolls of preferred construction for use in forming a candy rope in accordance with this invention;

Fig. 11 is a detached view in elevation of two candy forming rolls shown in Fig. 10 and driving means for the same;

Fig. 12 is a sectional view taken substantially on broken line 12—12 of Fig. 11;

Fig. 12A is a fragmentary sectional view showing two candy forming rolls of modified form;

Fig. 13 is a fragmentary side view of a candy rope before twisting, showing how said rope will be indented by passing it through the forming rolls illustrated in Figs. 11 and 12 to provide for the subsequent division of said rope into sticks of uniform length and which have uniform ends;

Fig. 14 is a view partly in section and partly in elevation taken on broken line 14—14 of Fig. 13;

Fig. 15 is an end view of a candy stick as it may appear after it has been twisted and separated or broken loose from the candy rope;

Fig. 16 is a fragmentary plan view showing how a candy rope which has been indented at regular intervals may be broken into sticks as it passes beyond the end of a rotating shaft;

Fig. 17 is a view partly in section and partly in elevation showing how an indented candy rope may be broken into sticks by gravity as it discharges over the end of a candy carrying belt;

Fig. 18 is a fragmentary view partly in section and partly in side elevation showing tapper means for tapping the under side of an endless moving belt on which an indented candy rope is carried, to break said candy rope into sticks;

Fig. 18A is a fragmentary plan view showing an inclined member positioned so as to break a candy rope into sticks;

Fig. 18B is a view partly in elevation and partly in section showing another inclined member used to break a candy rope into sticks;

Fig. 19 is a small scale plan view of a candy carrying belt having shallow ribs extending diagonally across the same to slightly flex a marked or indented candy rope and break it into sticks;

Fig. 20 is a view partly in section and partly in elevation illustrating the operation of the ribbed belt shown in Fig. 19;

Fig. 21 is a fragmentary plan view showing a candy former positioned to discharge a candy rope substantially parallel to or in alignment with a candy twisting shaft, parts therein being diagrammatically shown;

Fig. 22 is a fragmentary side view of a candy twisting shaft of modified form;

Fig. 23 is a fragmentary sectional view illustrating how an endless moving belt may be used in place of a candy twisting shaft to help twist a candy rope;

Fig. 24 is a plan view showing four tables and four endless traveling belts and showing a different positioning and overlapping of these tables and belts than is shown in Fig. 1;

Fig. 25 is a plan view showing a single candy twisting table with four endless traveling belts installed therein;

Figs. 26 and 27 are sectional views illustrating means for reducing the width of the gap over which a candy rope must pass to get from one endless belt onto another endless belt;

Fig. 28 is a somewhat diagrammatic plan view illustrating an embodiment of this invention which is adapted to divide a candy rope into sticks of equal length but which only uses one candy carrying belt and which does not twist the candy rope.

Fig. 29 is another somewhat diagrammatic plan view showing apparatus similar to that shown in Fig. 28 except that it shows a plurality of candy carrying belts in end to end relation;

Fig. 30 is a view similar to Fig. 29 except that it shows candy guiding means in the form of an endless traveling belt instead of a fixed and non-movable candy guide; and Fig. 31 is a cross section showing a trough-shaped or transversely concave candy carrying belt which is adapted to support a candy rope without any candy rope guide means.

The exemplary form of this invention, as shown in the drawings, discloses three tables 20, 21 and 22 disposed in a common horizontal plane and in corner to corner (ie., echelon) relation with their adjacent end portions slightly overlapped. Preferably, the tables 20, 21 and 22 are rigidly secured together as by means 23. Three endless traveling belts 24, 25 and 26 are operatively disposed on the respective tables 20, 21 and 22, and are carried on suitable rollers 27, 27a, 27b, 27c, 27d and 27e. Belt 25 is preferably operated at a speed greater than belt 24, and belt 26 is preferably operated at a speed greater than belt 25. Such differential of speeds contributes to and augments the pulling force exerted upon the candy rope. A driven shaft 28 (i.e. rotatable shaft) extends diagonally or obliquely across the three tables close to but in a slightly spaced relation above the top laps of the endless traveling belts 24, 25 and 26. The rotatable shaft 28 is supported in bearings 29 which are carried by a frame bar 30. Brackets 31 may be used to support the frame bar 30 above the tables 20, 21 and 22.

A horizontal conduit 32 for air which is used for cooling purposes, see Figs. 1 and 3, may also be supported from the frame bar 30 as by brackets 33. This cooling air is for gradually removing the heat from the warm plastic candy rope while it is being treated to the twisting action to impart a twist thereto and being formed into a straight rigid rod of candy. The "forming" also includes being revolved to impart and maintain until it is cooled a circular form to the candy rope and the effect of being simultaneously subjected to the pulling action which overcomes the tendency to contract, and later in its course over the tables, to being separated into units. Also "forming" includes the twisting action resulting from the oblique conveying force in conjunction with the rotatable shaft. Air may be supplied to the conduit 32 by way of upright ducts 34 and this air is discharged from conduit 32 through slot forming means 35.

A continuous round rope 36 of soft warm candy is fed, as by means of pairs of driven grooved rollers 37, out of a suitable candy former or supply machine 38 from which it issues by way of guide means 39 onto the endless traveling belt 24 of the first table 21. This rope 36 of soft warm candy will be moved by the belt 24 against the diagonally positioned rotating shaft 28 and will be urged against said shaft and advanced longitudinally across the tables 20, 21 and 22 by belts 24, 25 and 26. At the same time, this rope 36 of soft warm candy will be twisted by the joint action of the diagonally positioned rotating shaft 28 and belts 24, 25 and 26. The angular relation of the rotating rod 28 to the direction of movement of conveyor belts 24, 25 and 26 (Fig. 1) creates a pulling (that is, longitudinal conveying force) and a rotating force, that is, twisting and round form maintaining force. Most of the twist will be imparted to the candy on the first table 20 and the twisted candy will be cooled as it progresses toward the discharge end of the machine. This cooling of the candy is accomplished by direct contact of the blast of cool air from the conduit 32 and by contact of the candy with the metal shaft 28. This metal shaft 28, being a good conductor of heat and being within the blast of air from the conduit 32, will help to rapidly extract and dissipate the heat from the candy.

The shaft 28 is rotated in the direction indicated by the arrows A in Figs. 2 and 3 to thereby provide upward movement of the portion of said shaft which is in contact with the candy rope 36. This tends to rotate the candy rope 36 in the reverse direction from the shaft 28 as indicated by arrows A and B. At the same time, the traveling belts 24, 25 and 26 moving in the direction indicated by arrows C, assist in rotating the candy rope 36 in the direction indicated by arrows B and keep said candy rope 36 in firm contact with the shaft 28. The speed of the rotating shaft 28 is such as to maintain the candy rope in round form. The candy rope may come upon the first conveying belt in such a plastic condition that it would tend to flatten if it was not rotated.

The peripheral speed of the shaft 28 is faster than the lineal speed of any of the candy carrying belts 24, 25 and 26 to preclude any possibility of the candy rope being drawn under the shaft 28 between said shaft and any of the belts. The component of lineal speed of the first belt 24 in the direction in which the candy moves along the shaft 28 is slightly faster than the lineal speed at which the candy rope issues from the former 38. Also the lineal speed of each succeeding belt, as stated, is slightly faster than the speed of the belt ahead of it. This contributes to developing a pulling force and keeps the candy rod of straight formation. This pulling force keeps the candy rope under tension and compensates for slippage and offsets a natural tendency of the candy rope to contract.

Means is provided at the discharge end of the machine for cutting the candy rope or rod 36 into units of stick length and for further cooling (if necessary) of these sticks. The cutting means comprises two endless traveling link belts 40 and 41, see Figs. 1, 5 and 9.

The two link belts 40 and 41 operate in a horizontal plane with two laps of said belts in parallel spaced apart relation and positioned so as to receive therebetween the now cooled, or substantially cooled, rod 36 of twisted candy as it passes off of the last endless traveling belt 26 and over a candy supporting plate 42. The stick is now sufficiently cooled under minimum cooling operation so that it is form retaining so far as its round and stick character is concerned.

The link belts 40 and 41 are carried on horizontal sprocket wheels 43 mounted on upright shafts 44, 45, 46 and 47. One of the link belts, such as link belt 41, is a roller type link belt of standard construction. The other link belt 40 has candy cut-off blades 48, Fig. 9, secured thereto at predetermined intervals of stick unit length, and between the blades 48 has candy supporting shelf plates 49 on which the candy may rest as it enters between the link belts 40 and 41 and after it has been cut off.

Preferably, fixed guide or backing bars 50 are provided in contact with the laps of the link belts 40 and 41 between which the candy sticks pass to support these parts of the link belts and hold them steady. Obviously, the number of cut-off blades 48 which are provided in the link belt 40 can be varied depending on the length and speed of said link belt and the length of candy stick desired. The link belts 40 and 41 are driven in the directions indicated by the arrows in Figs. 1 and 9 by means hereinafter described.

The portion of the moving rope or rod 36 of twisted candy which is between the link belts 40 and 41 is supported on the moving shelves 49 and a predetermined length of said candy rope is cut off each time a blade 48, as shown, passes around the sprocket wheel 43 on the shaft 44 to thereby form a candy stick 36' (Fig. 1). The blade which cuts off the candy stick follows it throughout the length of the link belts 40 and 41 and may act as a pusher to insure properly timed delivery of the candy stick 36' into a stationary trough 51. Preferably, the link belts 40 and 41 move faster than the rope 36 of twisted candy so that each severed candy stick 36' is spaced from the next succeeding stick by the time it is delivered into the trough 51, see Fig. 1. This provides a timing mechanism and allows each candy stick 36' to rest for a short period of time in the trough 51 after which it is pushed by the next succeeding stick into a grooved rotor 52, see Figs. 1, 4, 5 and 9, which operates intermittently as hereinafter described.

The function of the grooved rotor 52 is to deliver the candy sticks 36' in properly timed relation onto a link belt conveyor 53 which has transverse slats 54, and provides for further cooling when necessary. The slats 54 provide a separate compartment for each candy stick 36' and thus guard or insure against one stick adhering to another. The rotor 52 has a plurality of pockets 55, each adapted to receive a candy stick 36'. Said rotor 52 is supported on a shaft 56 which is journaled in bearing means 57, Fig. 1.

The conveyor 53 is mounted on sprocket wheel means 70 and 71, Fig. 4. The shaft 72 which carries the sprocket wheel means 70 has a ratchet wheel 59, Figs. 1 and 5, provided thereon for intermittent driving purposes. A pawl 60 carried by a longitudinally reciprocable arm 61 engages with the ratchet wheel 59. The arm 61 is supported in guide means 62 and is connected by a pivot member 63 with a rod 64. The rod 64 is connected, as by an eccentric disc, and collar 65 with a continuously driven shaft 66. The shaft 66 is connected by link belt 67 and sprocket wheels 68 and 69 with the upright shaft 45 of the candy cut-off means.

The grooved rotor 52 is intermittently moved or driven by a link belt 73 operating on one sprocket wheel 74 on the shaft 56 and another sprocket wheel 75 on a countershaft 76. The countershaft 76 is driven from the shaft 72 of the cooling conveyor 53 by meshed gear wheels 77.

Figs. 5 to 8 inclusive show somewhat diagrammatically one type of driving mechanism which may be provided for this candy twisting machine. Obviously, this driving mechanism may be widely varied.

This driving mechanism, as illustrated in Figs. 5 to 8 inclusive, comprises a motor 80 connected by V-belt and sheave means 81 with a shaft 82. The shaft 82 is connected by link belt and sprocket wheel means 83 with another shaft 84. The shaft 84 is connected by bevel gears 85, Fig. 6, upright shaft 86, and bevel gears 87 with the candy twisting shaft 28 which extends diagonally across the endless traveling belts 24, 25 and 26. The rollers 27a, 27c, and 27e on which the respective endless traveling belts 24, 25 and 26 are carried are driven from the shaft 84 as follows: Link belt and sprocket wheel means 88 connect the shaft 84 with a countershaft 89 and said countershaft 89 is connected by worm gear means 90 with another countershaft 91. The roller 27a is driven from the countershaft 91 by link belt and sprocket wheel means 92. The roller 27c is driven from the countershaft 91 by link belt and sprocket wheel means 93. The roller 27e is driven from the roller 27c by link belt and sprocket wheel means 94.

The upright shaft 45 with which the endless link belt 41 of the candy cut-off means is connected is driven from the countershaft 91, Figs. 5 and 7, by a link belt 95 which extends around a sprocket wheel 96 on the countershaft 91 engages with another sprocket wheel 97 on a shaft 98. Idler sprocket wheels 90' and 91' guide the link belt 95, as shown in Fig. 7, to provide correct direction of rotation of the shafts 98 and 45. Bevel gears 99, Fig. 8, connect the shaft 98 with the upright shaft 45.

The shaft 44 is driven from the shaft 45, see Fig. 8, by bevel gear 92', shaft 93', and bevel gears 94'. Bevel gear 92' meshes with bevel gear 99 on upright shaft 45.

The modified and preferred general form of my invention now will be set forth:

In Figs. 10 to 16 inclusive a modified and preferred general form of my invention is illustrated. This form is characterized by providing a uniform candy rope since for the most part it overcomes the human element involved in gauging the amount and rate of feeding the candy to the rollers of the candy rope forming machine. Also, the preferred form is characterized particularly in providing for partial cuts through the plastic candy rope before it starts on the conveyor belts thereby providing for automatic separation of the candy rope or rod into units of stick lengths without the special cutting mechanism shown in Fig. 9 already described. This partial cutting results in a uniform pattern of end portions for each stick of candy and reduces breakage in separating the candy rope or rod into units.

Fig. 10 shows a set of candy forming rollers generally similar to the previously mentioned rollers 37 but which are adapted to mark or indent a candy rope at the locations where it is subsequently to be broken to form candy sticks, and provides a positive metering of the candy fed between the rollers to insure a rope of candy of uniform diameter. The set of rollers shown in Fig. 10 may comprise seven pairs of peripherally grooved mated rollers 100 to 106 inclusive. Each roller has an annular peripheral groove of substantially semi-circular shape. The two rollers of each pair are positioned with their side flanges in peripheral contact. The grooves of the two rollers of each pair cooperate to form a circular or substantially cylindrical candy passageway at the location where the two rollers of each pair are in contact with each other. The circular opening or passageway provided by the first six pairs of rollers 100 to 105 inclusive are of successively smaller size. All of the rollers 100 to 106 inclusive are driven in the direction indicated by the arrows in Fig. 10. The first pair of rollers 100 in the set provide the largest opening and are made of non-elastic material so that when soft warm candy is fed into these rollers 100 they will positively reduce this candy to an oversize candy rope of uniform diameter. The successive sets of rollers 101 to 105 inclusive may be made of elastic material, such as fairly firm rubber. The last pair of rollers 106, Figs. 11 and 12, are made of elastic material and preferably provide a cylindrical opening of the same size as provided by the pair of rollers 105. The last pair of rollers 106 are provided, within their cylindrical grooves, with transverse matching teeth or cutting blades 107 which terminate short of the peripheries of these rollers and which are adapted to make opposed indentations, cuts or creases 108 in the candy rope. These indentations 108 are formed at regular intervals and mark the locations where the rope is to be divided to form units of candy stick length. Meshed gear wheels 109 of equal size on the shafts 110 of the rollers 106 insure proper synchronization of said rollers 106.

The rollers 100 reduce the candy to an oversize rope of uniform diameter. The operator may feed the candy stock from the batch in a quantity greater than will be received by the rollers 100 and thereby insure a uniform and minimum size of candy rope. This greatly reduces the danger on the part of the human element in not feeding sufficient candy to maintain the uniform diameter of candy rope since he only has to take care that he feeds an oversupply of candy to the rollers 100. As long as he maintains an oversupply, which degree of oversupply may vary, the uniformity of the diameter of the rod will be maintained by the non-elastic rollers 100 affording a positive gauging means—the only condition being that he maintain an oversupply whether it be great or small as to degree. Ordinarily, the candy former has elastic rollers in forming the candy rope. My invention changes this construction by providing rigid non-elastic rollers, particularly the first pair or the first two or three pairs of rollers of the series. This I find takes care of the human element and results in a uniform diameter of candy rope. Each succeeding pair of rollers 101 to 105 inclusive reduces the diameter of this candy rope, as indicated by dotted lines in Fig. 10. The intermediate rollers also may be of said non-elastic type.

The next to last pair of rollers 105 complete the accurate sizing of the candy rope and the last pair of rollers 106 put the opposed indentations 108 in the same to insure breaking at the proper locations to provide sticks of uniform length. The rollers 105 and 106 are driven at the same peripheral speed.

In putting the opposed indentations 108 into the candy rope, the teeth or blades 107 of the rollers 106 partially sever the candy rope and leave between the ends of the teeth 107 a relatively thin connecting strip 111 of candy, see Figs. 13 and 14. This strip 111 is thin enough and strong enough so that it will transmit the necessary torsion to twist the candy rope and as the candy rope is twisted this strip 111 will be twisted somewhat in the manner shown in Fig. 15. The connecting strips 111, being thin and flat, will harden and become set faster than other parts of the candy rope. The hardening contributes to the necessary strength of connecting material to provide for twisting of the candy rope for the necessary portion of its longitudinal travel to bring about the necessary degree of twisting. It will be understood that the first part of the rope of candy must be held while the forward portion of the rope is being subjected to the twisting force of the conveying belts and rotating shaft. This connecting strip 111 I have discovered is of sufficient strength to permit of such twisting of the rope. The slight twist which it receives also may contribute somewhat to its strength in permitting of such twisting. Also such strip 111 functions in rendering it possible to easily break evenly and uniformly the rope of candy into stick unit lengths after the twisting process has been completed and after the candy has been at least partially cooled.

Fig. 12A shows two rollers 106a which are similar to the rollers 106 except that they are provided between longer blades 107a with shorter blades 107b which provide shallow indentations 108b in a candy rope at regular intervals between the deeper indentations 108a. When a candy rope is marked with the rolls 106a it will break into sticks at the location of the deeper indentations 108a and the sticks may later be broken at the locations of the shallow indentations 108b to provide pieces of equal length for consumers of the candy.

As illustrated in Fig. 16, a candy rope 36 is broken at the location of identations 108 by extending the discharge end of the last candy carrying belt 26 beyond the end of the candy twisting shaft 28. The force of the belt 26 tends to bend the candy rope at the location where the candy rope passes beyond the end of the shaft 28 and this applies a transverse force which breaks the hardened connecting strips 111.

Fig. 17 illustrates how the connecting strips 111 of a candy rope 36 may be broken by force of gravity as the candy rope discharges over the end of the last candy carrying belt 26.

Fig. 18 illustrates tapper means which may be used to break into sticks a candy rope which has been provided with indentations 108 and connecting strips 111 as shown in Figs. 13 and 14. The tapper mechanism shown in Fig. 18 is preferably used in connection with the last candy carrying belt of a series, such as the belt 26 of Fig. 1 or the belts 165 or 173 of Figs. 26 and 27. One tapper unit is shown in Fig. 18 and it will be understood a plurality of these units may be used if desired. The tapper unit shown in Fig. 18 comprises a lever arm 112 fulcrumed on a pivot 113. The lever arm 112 has tapper means 114 on one end thereof positioned to strike against the underside of a belt 26 on which a candy rope is being carried. The tapper means 114 is positioned so that it may strike the belt 26 directly underneath the candy rope. A tension spring 116 is connected with the lever arm 112 so as to exert a resilient force which tends to snap the tapper means 114 against the belt 26. A driven ratchet wheel 117 rigid with a shaft 118 is positioned to engage with an integral pawl 119 on the lever arm 112. When the ratchet wheel 117 is rotated in the direction indicated by the arrow in Fig. 18, the end portion of the lever arm 112 which carries the tapper 114 will alternately be moved downwardly by the ratchet wheel 117 and then snapped upwardly by the spring 116 to cause the tapper member 114 to strike the belt 26. This tapping will break the substantially cold candy rope at the locations of the indentations 108 therein.

Figs. 19 and 20 illustrate how a candy rope which has been provided with the indentations 108 and connecting strips 111 may be broken into sticks by using preferably as the last candy carrying belt of a series, a belt 120 which is provided on its outer or candy carrying side with shallow ribs or ridges 121. The shallow ribs 121 are positioned on the belt so that they extend across the line along which the candy rope is moved. The ribs 121 will tend to elevate the candy rope slightly at the locations where said candy rope passes over the ribs and this will be sufficient to fracture the hardened connecting strips 111 but will not break or bend the candy rope between these connecting strips. The surface speed of the belt 120 is slightly greater than the lineal speed of the candy rope and for this reason there will be some slippage of the ribs 121 under the candy rope. This will increase the tendency of the shallow ribs 121 to break the connecting strips 111.

Fig. 18A shows how an inclined member, such as a wedge 200, may be positioned alongside of a candy twisting rod 28 to deflect an indented candy rope sidewise away from the rod 28 and thereby break it into sticks 36'. Wedge 200 may be supported by bracket 201 which is attached to bar 30. Wedge 200 is positioned beyond the point where cooling air is being blown onto the candy rope.

Fig. 18B shows an inclined member 202 supported, as by means 203, above a candy carrying belt 26 alongside of a candy twisting rod 28 to break an indented candy rope 36 into sticks 36' by deflecting the same upwardly.

Fig. 21 shows a form of this invention in which a candy former 122 is positioned in substantial alignment with a candy twisting shaft 28 so that it will feed a candy rope 36 outwardly substantially parallel to said shaft 28. This arrangement makes it possible to get the candy rope 36 into contact with the first endless moving belt 123 and with the candy twisting shaft 28 without much bending of the candy rope. If the candy formers are positioned in substantial alignment with the first candy carrying belt, as shown in Figs. 1 and 24, then the candy rope must be bent into alignment with the candy twisting shaft and while so bent may set to such an extent that it does not entirely straighten out later and some of the candy sticks may be curved. Aligning the candy former with the candy twisting shaft 28 obviates the danger of producing curved sticks.

It may be advantageous to vary the rotary speed of the candy twisting shaft 28 relative to the lineal speed of the candy rope and the candy carrying belts, particularly for candy units of greater or less diameter. Fig. 21 shows independent driving means for the candy twisting shaft. This means is illustrated as a variable speed power unit 124 connected as by sprocket wheels 125 and 126 and link belt 127 with the candy twisting shaft 28, so that such variations may be readily obtained.

Fig. 21 also shows somewhat diagrammatically means for synchronizing the speed of the rollers in the candy former 122 with the candy carrying belt 123. The driving and synchronizing means shown in Fig. 21 comprises a driven shaft 128 connected with the candy carrying belt 123 by sprocket wheels 129 and 130 and a link belt 131. Shaft 128 is further connected with the rolls of the candy former 122 by bevel gears 132, upright shaft 133, bevel gears 134 and shaft 135. The structure shown in Fig. 21 thus provides means to keep the belts and candy twisting shaft in proper pace with the candy former.

Fig. 22 is a fragmentary view showing a candy twisting shaft 136 of modified or alternative construction which is designed to promote a better circulation of air around the candy rope. This candy twisting shaft has alternate annular grooves 137 and lands 138. The grooves 137 allow a free circulation of cooling air. The lands 138 contact the candy rope and transmit a rotating force which with the conveying belts, develops a twisting torque thereto.

Fig. 23 shows a modified or alternative means in place of rotating shaft 28 for imparting a twist to a candy rope 36. This means comprises an endless driven candy twisting belt 140 carried on two rollers 141 and 142, one of which is driven so as to move the belt 140 in the direction indicated by the arrows. The candy rope 136 is carried on a candy carrying belt 143 which passes under the candy twisting belt 140 and moves in a direction oblique to the axis of the roller 142 so that it will cooperate with the candy twisting belt in imparting a twist to the candy rope.

Fig. 24 shows four tables 145, 146, 147 and 148 arranged in end-to-end transversely offset partially overlapped relation, i.e., in echelon relation. Four endless moving candy carrying or conveying belts 149, 150, 151, and 152 are operatively disposed on rollers 153 on the respective tables 145, 146, 147 and 148. Suitable driving means may be connected with an outwardly extending shaft 154 of one roller 153 of each table. The rotative or candy twisting shaft 28 and supporting bar 30 shown in Fig. 24 are similar to the correspondingly numbered parts shown in Fig. 1 and extend diagonally across the four tables and the candy twisting shaft and candy carrying belts shown in Fig. 24 function similarly to those shown in Fig. 1 to twist a candy rope 36. Preferably, candy forming rolls similar to those disclosed in Figs. 10, 11 and 12 are used in the apparatus shown in Fig. 24 so that the soft candy rope 36 will be indented or partially severed before it comes out of the candy former and may be broken into uniform sticks after it has been twisted and cooled and before or at the time it discharges from the last belt 152. One of the candy forming rollers 106 is shown by dotted lines in Fig. 24.

Fig. 25 shows four endless traveling candy carrying belts 156, 157, 158 and 159 mounted in end-to-end transversely offset partially overlapped or echelon relation in a single table 160. The candy carrying belts of Fig. 25 are mounted on rollers 161 and are positioned similarly to the candy carrying belts of Fig. 24 and function in a similar manner and have a driven candy twisting shaft 28 and supporting bar 30 extending diagonally across the same. One of the rollers 161 for each belt 156, 157, 158 and 159 may have suitable driving means connected with a sprocket wheel 162 which is attached to the roller. In Fig. 25 the table 160 is shown to be of rectangular shape, but it will be understood that this shape may be varied. For instance, this table 160 may be cut off along the dot and dash line 163 and/or dot and dash line 163a to conserve space and provide a closer and easier access to the candy carrying belts.

Figs. 26 and 27 show conveyor belt guiding means which may be used in connection with the candy carrying belts to reduce the gap between adjacent belts across which the candy rope must pass to go from one belt to another. This belt guiding means is well adapted for use in apparatus where the candy carrying belts are relatively positioned in end-to-end relation, as shown in Figs. 24 and 25. Fig. 26 shows one loop or bight of a candy carrying belt 165 passing slidably around a relatively flat plate shaped stationary belt guide 166. The other bight of the belt 165 passes around a driven roller 167 and an idler roller 168 is used to obtain a greater area of contact of the belt 165 with the driven roller for driving purposes and to compensate for the added friction of the belt 165 on the guide 166. The belt guide 166 may be placed in close proximity to another belt 169 on a roller 170 so that there is only a short gap between the two belts 165 and 169.

Fig. 27 shows two relatively flat plate shaped stationary spaced apart belt guides 171 and 172 supporting the two loops or bights of a candy carrying belt 173. Where a belt 173 is thus supported on two belt guiding devices 171 and 172 over which it must slide, said belt may be driven by passing it around a driven roller 174 and holding said belt in contact with the driven roller 174 by use of preferably two idler rollers 175 and 176.

Figs. 28, 29, 30 and 31 show embodiments of this invention which are adapted to divide a candy rope into sticks of uniform length and size without twisting said candy rope.

Fig. 28 shows a relatively long endless horizontal driven candy carrying belt 180 mounted on rollers 181 on a table 182. A fixed candy guide bar 183 is supported above and in close proximity to the belt 180 and is disposed at a slight angle relative to the direction of movement of the top lap of the belt. A candy rope 36, of the type shown in Figs. 13 and 14 and which has the indentations 108 provided therein, is fed onto the belt 18 alongside of the guide bar 183 by candy former means having an end or terminal pair of grooved rollers 106 like those shown in Figs. 11 and 12, said rollers having teeth like the teeth or blades 107 shown in Figs. 11 and 12. The top lap of the belt 180 is moved at a lineal speed faster than the speed at which the candy rope 36 is fed from the former. This allows for some slippage of the belt 180 under the candy rope and keeps a constant tension on the candy rope. Candy cooling means of the type shown in Fig. 1 may be provided for cooling the candy rope 36 on the belt 180. The guide bar 183 cooperates with the moving belt 180 to prevent the candy rope from being deflected sidewise off of the belt 180. The inclination of the guide bar 183 relative to the direction of movement of the belt 180 is slight and the candy rope 36 will not be twisted but will be kept under tension and cooled as it moves with the belt. The cooled candy rope 36 may be broken by gravity into sticks of uniform length as it discharges over the end of the belt 180 or it may be broken by tapper means of the form shown in Fig. 18, or ribs like those shown in Figs. 19 and 20 may be provided on the belt 180 to break the candy rope into sticks.

In the modification of this invention shown in Fig. 29, the guide bar 183 and rollers 106 and candy rope 36 with indentations 108 are the same as shown in Fig. 28 and are similarly numbered. The candy rope carrying belt means shown in Fig. 29 comprises a plurality of candy carrying belts 185, 186, 187 and 188 supported in end-to-end relation by rollers 193 for movement over tables 189, 190, 191 and 192. The belts 185 to 188 inclusive may be driven by suitable driving means which may be connected with one roller of each table 189 to 192 inclusive by a sprocket wheel 194 on the shaft of the roller. The first belt 185 is driven at a lineal speed slightly greater than the lineal speed at which the candy rod is extruded from the candy former and each successive belt 186, 187 and 188 is driven at a slightly faster speed than the belt ahead of it. This keeps the candy rope 36 under constant tension while it is cooling. The incline of the guide bar 183 relative to the lineal direction of movement of the belts 185 to 188 inclusive is slight and the candy rope is guided but is not twisted.

In the modification of this invention shown in Fig. 30, the belts and tables and rollers and sprocket wheels 185 to 194 inclusive are the same as those shown in Fig. 29 and are similarly numbered. The means for feeding the candy rope 36 is also the same as shown in Figs. 28 and 29. The candy rope guiding means shown in Fig. 30 is in the form of an endless driven belt 195 operating on upright rollers 196. A supporting bar 197 may be used to support the rollers 196 and belt 195. The belt is driven in the direction indicated by the arrows in Fig. 30 so that the lap of said belt contacted by the candy rope 36 will be moving in the same direction as the candy rope and at least as fast as the candy rope.

In the adaptation of the invention shown in Fig. 31, a candy rope 36 is carried on an endless moving belt 198 which is trough-shaped transversely considered so that a candy rope 36 which is not guided will lie in the trough afforded by said belt and will not need to be guided. One or more of the transversely concave belts 198 may be used in an installation.

Mode of operation

Much of the mode of operation of the device has been set forth in the above description of the construction of the machine.

It will be noted that my invention in its preferred form provides a twisted candy stick, mechanically and automatically formed. This is accomplished by causing the candy rope 36 as it issues from a candy rope former or supply machine 38 to extend across moving belts 24, 25 and 26 disposed at an angle to a guide means in the form of a rotating shaft 28, whereby a twist is imparted to the candy rope 36, see Figs. 1, 2 and 3, by the combination of the forces imparted by the rotating shaft 28 and by the moving belts primarily 24 and 25 (the candy receiving little twist on belt 26 due to its cooled condition). Belt 25 runs at a slightly greater speed than belt 24, and belt 26 at a greater speed than belt 25, thereby imparting a stretching or pulling force to the candy rope 36 at the same time it is receiving the rotating or twisting force just described.

It will be understood that the cooling means provided by the cool air conduits 32 gradually cools the candy rope 36 as it extends across the tables, and also this cooling operation is supplemented by contact with the shaft 28, which is preferably provided with annular grooves 137 and lands 138 which provides for free circulation of cooling air about the candy rope 36 and the shaft 28.

While the candy rope may be manually formed, the candy forming machine with the rope forming pairs of rollers is, of course, preferred and such former is preferred to have the changes provided by my invention described in connection with Fig. 10. That is, the candy rope 36 may be manually formed prior to passing upon and manually fed to the conveyor or twisting belt 24. This may be done instead by having it issue from the candy rope former or supply machine 38 before it passes upon the conveyor or twisting belt 24.

To the end of providing a simple machine, the preferred form of my invention subdivides the candy rope 36 into stick length without any complicated mechanism for such dividing; that is, the candy rope is provided with transverse cuts extending part way through the rope by means shown in Figs. 11 and 12. A more complicated mechanism for such subdividing without any initial transverse cuts is shown in Figs. 1 and 4.

The preferred form, as set forth, initially partially severs the rope 36 by making transverse cuts 108 and then subsequently, after cooling, subjecting the reduced connecting part to a snapping or breaking force directed at an angle to the longitudinal axis of the candy rope or rod. This angular force may be developed in several ways:

One way of developing this angular force is by using the conveyor belt carrying the unsupported end of the candy rope 36 beyond the end of the rotating shaft 28.

Another way is using the force of gravity as the candy rope 36 is forced beyond the end of the table.

Another way is to use a periodic tapper means 114 applied beneath the conveyor belts, the blow of said tapper being delivered below the candy rope.

Another way is to use a wedge-like member 200 to deflect the candy rope from its path, as shown in Fig. 18A or Fig. 18B.

Still another way is to provide one of the last conveyor belts over which the candy rope 36 moves with spaced apart ridges.

In following the preferred form of subdividing by providing the candy rope 36 while in a soft plastic condition with an initial cut transversely of the rope, it is to be noted that the rear end of the candy rope 36 must be held against rotation in order to provide for the twisting to be imparted to the rope part extending forwardly over the conveyor means. This holding is done by creasing rolls 106. I have made this discovery that the candy rope 36 can be thus initially cut transversely at stick lengths as a part of the subdividing operation, although it would be expected that the candy rope or rod 36 when so partially cut would tend to twist in two and not have the strength to serve properly to hold back on the rear end of the candy rod or rope while the forward end of the candy rope 36 is being subjected to twisting.

I have discovered that by imparting a cut of a predetermined width in the candy rope 36 spaced apart at stick lengths while it is soft and issuing from the candy puller or former, the reduced connecting link will receive a slight twist by the twisting action of the twisting or rotatable shaft 28 to a point where it will be of sufficient strength to contribute to hold the rear part of the candy rope 36 sufficiently to permit of the forward part being twisted without breaking the weakened rope 36 of candy at the cut point 108. In this connection, due to the reduced area at the reduced joint part 108, advantage is taken of a differential cooling of the rope of candy since this reduced area cools much quicker than the adjoining body of the stick of candy. This contributes strength to the reduced joint portion so that it does not break prematurely while the rest of the rope 36 is receiving its twist. The degree of twist imparted, as above mentioned, reduces the gap provided by cutting the soft plastic rope and operates to maintain the stick candy of uniform length without leaving any objectionable projection on the end of the candy stick, but rather provides a uniform pattern of the end.

Machine precision, accuracy, speed and uniformity to meet the requirements of wrapping machines are among the essentials of this improvement. Such provisions cannot be provided by equipment in which the candy rope is manipulated by hand.

This application, directed to method claims, is a divisional application of my pending United States application Serial No. 219,024, filed April 3, 1951, now U.S. Patent No. 2,767,665, dated October 23, 1956, entitled "Process of Forming Candy Units and Units of Stick Length Having a Twist and Mechanism for Carrying Out Said Process."

Obviously, changes may be made in the forms, dimensions, and arrangement of the parts of my invention, without departing from the principle thereof, the above setting forth only preferred forms of embodiment.

I claim:

1. In the method of providing twisted stick candies comprising mechanically forming a rope of candy in plastic condition; initially providing cuts in said rope of candy partially extending diametrically through said rope at stick length points of said rope while plastic; subjecting said rope of candy to a conveying-pulling force longitudinally of said rope; and imparting simultaneously and separately to said pulling force a rotary guiding force transversely of said conveying-pulling force through line contact with said rope.

2. In the method of providing twisted stick candies comprising mechanically forming a rope of candy in plastic condition; initially providing cuts in said rope of candy partially extending diametrically through said rope at stick length points of said rope; subjecting said rope of candy to a conveying-pulling force longitudinally of said rope; imparting a spinning force to said candy rope transversely of its longitudinal axis to subject said candy rope to a centrifugal force in causing it to rotate about its longitudinal axis while plastic in maintaining a uniformity of straightness and roundness while cooling; and applying the conveying-pulling force in breaking the candy rope into stick units.

3. In the process of forming a batch of candy into stick units, the steps of forming a plastic rope of candy; and imparting a spinning force to said candy rope while plastic, said force being of a magnitude to provide a centrifugal force having a speed which causes said rope to rotate transversely of its longitudinal axis in providing uniformity of straightness and roundness of the rope.

4. In the method of providing twisted stick candy comprising mechanically forming a rope of candy in plastic condition; initially providing cuts in said rope of candy partially extending diametrically through said rope at stick length points of said rope; subjecting said rope of candy to a conveying-pulling force; strengthening simultaneously with said subjecting of conveying-pulling force said rope of candy at said "cut" portions by cooling prior to the body portion of the individual candy sticks; and imparting a rotary guiding force to said rope of candy at an angle to the direction of the conveying-pulling force.

5. The process of automatically forming twisted stick candy comprising forming a candy rope in warm plastic condition; imparting parallel transverse indentations on opposite sides of the diameter of the rope spaced apart longitudinally at stick lengths in forming links of reduced dimension between the sticks; subjecting said candy rope to a conveying-stretching force; subjecting said candy rope to cooling in inducing a differential cooling and hardening as respects the reduced connecting link portions compared to the body of the candy stick intermediate the length of said stick in increasing the strength of said link portion; and subsequently automatically breaking said link portions in separating the sticks.

6. The process of automatically forming twisted stick candy comprising forming a candy rope in warm plastic condition; imparting parallel transverse indentations on opposite sides of the diameter of the rope spaced apart longitudinally at stick lengths in forming links of reduced dimension between the sticks; subjecting said candy rope to a conveying-stretching force; subjecting said candy rope to a twisting force about its longitudinal axis simultaneously with said conveying-stretching force in reducing the gap between successive sticks formed by the indentations and imparting a spiral effect on the candy stick; subjecting said candy rope to cooling in inducing a differential cooling and hardening as respects the reduced connecting link portions compared to the body of the candy stick intermediate the length of said stick in increasing the strength of said link portion; and subsequently automatically breaking said link portions in separating the sticks.

7. The process of automatically forming twisted stick candy comprising forming a candy rope in warm plastic condition; imparting parallel transverse indentations on opposite sides of the diameter of the rope spaced apart longitudinally at stick lengths in forming links of reduced dimension between the sticks; subjecting said candy rope to a conveying-stretching force in offsetting the inherent contraction tendency of heated candy in cooling; subjecting said candy rope to a twisting force about its longitudinal axis simultaneously with said conveying-stretching force; subjecting said candy rope to cooling in inducing a differential cooling and hardening as respects the reduced connecting link portions compared to the body of the candy stick intermediate the length of said stick in increasing the strength of said link portions; and subsequently automatically breaking said link portions in separating the sticks with a relatively uniform pattern of broken ends.

8. The process of automatically forming twisted stick candy comprising forming a candy rope in warm plastic condition; imparting parallel transverse indentations on opposite sides of the diameter of the rope spaced apart longitudinally at stick lengths in forming links of reduced dimension between the sticks; subjecting said candy rope to a conveying-stretching force in offsetting the inherent contraction tendency of heated candy in cooling; subjecting said candy rope to a twisting force about its longitudinal axis simultaneously with said conveying-stretching force; maintaining said candy rope straight by subjecting same to a revolving force about its longitudinal axis while being conveyed and stretched; subjecting said candy rope to cooling in inducing a differential cooling and hardening as respects the reduced connecting link portions compared to the body of the candy stick intermediate the length of said stick in increasing the strength of said link portions; and subsequently automatically breaking said link portions in separating the sticks with a relatively uniform pattern of broken ends.

9. In the process of forming a batch of candy into units, the steps of forming a heated plastic rope of candy; providing cuts transversely of the candy rope spaced apart at stick unit length; rotating said plastic candy rope longitudinally of its axis by a force applied in line contact which imparts a centrifugal force to said candy rope transversely of its longitudinal axis, said force being of a magnitude and speed which maintains the rope round; cooling said rope of candy; and automatically subdividing said rope into separate stick lengths by subjecting said rope of candy to a force engaging said rope of candy at an angle to the longitudinal axis of said rope of candy.

10. The process of forming a plastic batch of candy which is of crystalline character when cooled into units of stick forming comprising automatically metering a plastic candy mass, which is of a crystalline character when cooled, into a candy rope of uniform diameter; partially severing transversely said candy rope at stick lengths while plastic leaving a relatively thin connecting strip between the partially formed stick units while laterally supporting portions of the rope adjacent the strips in maintaining the roundness of said rope; and subjecting said rope of candy to conveying-pulling forces longitudinally of the axis of said rope in conveying said rope longitudinally and in placing said rope under tension in opposing contracting of said plastic rope as it cools.

11. The process of claim 10 further comprising, imparting simultaneously and separately to said conveying-pulling force a rotary force to said rope by line contact transversely of its longitudinal axis and causing it to rotate about its longitudinal axis while plastic with a speed which subjects said candy rope to a centrifugal force which maintains said candy rope straight and round.

12. In the process of providing twisted stick candy, the step of forming a candy rope; subjecting said rope of candy to conveying-pulling force longitudinally of the axis of said rope; and simultaneously and separately to said rope of candy causing it to develop a centrifugal force which causes the rope while plastic to rotate transversely of its longitudinal axis, said centrifugal force being of a magnitude which maintains said candy rope straight and round.

13. In the process of providing twisted stick candy, the steps of automatically metering a warm plastic candy mass into an unconfined candy rope which is of a crystalline character when cooled, partially severing transversely said candy rope at stick lengths while plastic leaving a relatively thin connecting strip between the partially formed stick units; subjecting said connecting strip to a twisting force after providing said thin connecting strips and while the candy rope is cooling; subjecting said connecting strip simultaneously to a conveying-pulling force and twisting force after providing said thin connecting force, said forces continuing for a substantial period after providing said thin connecting strip and while said connecting strip is cooling; and breaking said thin strip of said rope of candy when it has acquired a crystalline character upon cooling and thus dividing said rope into individual sticks.

14. In the process of providing twisted stick candy the following steps in sequence of forming a warm plastic unconfined candy rope; indenting said rope of candy at stick length points; subjecting said rope of candy to a conveying-pulling force longitudinally of its axis and partially blocking and diverting the movement imparted by said conveying-pulling force into components, one component causing the candy rope to be moved longitudinally of its axis and another component urging the candy rope against a rotary force transversely directed of the longitudinal axis of said rope; and breaking said candy rope into sticks when it has acquired a crystalline character upon cooling and thus dividing said rope into individual sticks.

15. In the process of automatically and mechanically forming twisting stick candy comprising forming a candy rope in warm plastic condition; imparting radial transverse indentations on opposite sides of the diameter of the rope spaced apart longitudinally in stick lengths in forming links of reduced dimension between the sticks; the indenting operating to facilitate the holding of the end of the candy rope while being twisted; directing said rope of candy upon a conveying belt in the direction of movement of said belt; subjecting said rope of candy to a conveying-pulling force; partially blocking and diverting the movement imparted by said conveying-pulling force in causing the candy rope to be conveyed endwise as the resultant of the components of said conveying-pulling force and the blocking and diverting force.

16. In the process of automatically and mechanically forming twisting stick candy comprising forming a candy rope in warm plastic condition; imparting radial transverse indentations on opposite sides of the diameter of the rope spaced apart longitudinally in stick lengths in forming links of reduced dimension between the sticks; directing said rope of candy upon a conveying belt in the direction of movement of said belt; subjecting said rope of candy to a conveying-pulling force; partially blocking and diverting the movement imparted by said conveying-pulling force in causing the candy rope to be conveyed endwise as the resultant of the components of said conveying-pulling force and the blocking and diverting force; the direction of the resultant movement being different to the direction of feed which induces a curve in the rope of candy and provides, with said indenting, a holding of said end of the candy while being twisted.

17. In the process of automatically and mechanically forming stick candy comprising mechanically forming a candy rope in warm plastic condition without manual manipulation; forming along said rope longitudinally spaced pairs of diametrically opposed transverse radial indentations, so as to produce stick lengths connected by links of reduced dimension; and then subjecting said rope of candy throughout its available length to a mechanically developed power force applied longitudinally of the rope and simultaneously providing a conveying movement to the rope and subjecting it to a tension force tending to offset the inherent tendency of the candy rope to contract upon cooling, said force being continued until said rope is substantially cooled.

18. In the method of making a candy rope characterized by its straightness and uniform roundness comprising the steps of subjecting a formed rope while warm and plastic and unconfined to a conveying-pulling force longitudinally directed of the axis of said rope while the same is cooling, said force engaging the bottom of said candy rope for a greater part of its length and subjecting simultaneously said rope to a rotary force transversely directed of the longitudinal axis of said rope and engaging said rope laterally thereof.

19. In the process of mechanically and automatically forming stick candy, the treatment comprising mechanically forming a candy rope in the warm plastic condition without manual manipulation; forming along said rope longitudinally spaced pairs of diametrically opposed transverse radial indentations, so as to produce stick lengths connected by links of reduced dimension, said links becoming firm and strong and tending to cool more rapidly than the body of the stick; subjecting said rope of candy throughout its available length to a mechanically developed power force applied longitudinally of the rope and simultaneously providing a conveying movement to the rope and subjecting it to a tension force tending to offset the inherent tendency of the candy rope to contract upon cooling, said force being continued until said rope is substantially cooled; and automatically subdividing said rope into separate stick lengths by subjecting said rope of candy to a force engaging said rope of candy at an angle to the longitudinal axis of said rope of candy.

References Cited in the file of this patent
UNITED STATES PATENTS

| Number | Name | Date |
|---|---|---|
| 296,901 | Wick | Apr. 15, 1884 |
| 1,221,423 | Dempsey et al. | Apr. 3, 1917 |
| 1,393,144 | Laskey | Oct. 11, 1921 |
| 1,400,127 | Zaiss | Dec. 13, 1921 |
| 1,576,339 | Laskey | Mar. 9, 1926 |
| 1,640,868 | Zaiss | Aug. 30, 1927 |
| 1,915,528 | Haug | June 27, 1933 |
| 2,544,502 | Keller | Mar. 6, 1951 |